CIRCUIT FOR PREVENTING OVERDRIVING OF TRANSISTORS

Filed June 30, 1966

INVENTOR.
JERRY C. SCHMITT
BY Moody & Hallacher
ATTORNEYS 3,456,205
Patented July 15, 1969

3,456,205
CIRCUIT FOR PREVENTING OVERDRIVING OF TRANSISTORS

Jerry C. Schmitt, Columbus, Ind., assignor to Collins Radio Company, Cedar Rapids, Iowa, a corporation of Iowa Filed June 30, 1966, Ser. No. 561,868
Int. Cl. H03g *3/30;* H03f *3/04*
U.S. Cl. 330—29 3 Claims

ABSTRACT OF THE DISCLOSURE

An amplifier circuit with means for preventing overdriving of the amplifier transistor including a second transistor having a higher base-emitter impedance than said amplifier transistor, with the second transistor operably connected to the first transistor whereby driving the first transistor into a region of nonlinearity reduces the collector current of the second transistor. Advantageously, the decrease in collector current may be used to reduce the input voltage on the emitter of the first transistor.

This invention relates generally to transistor control circuits and particularly to a circuit for preventing a transistor from being overdriven into nonlinear operation.

Transistorized amplifiers, and in particular broadband high-frequency transistorized amplifiers, have the rather undesirable ability to generate subharmonics of the input signal. The presence of subharmonics is frequently undesirable because they appear in detected outputs and thereby render them inaccurate. Also, subharmonics frequently distort the output waveform and make it less accurate or useful. For these reasons many various methods of removing subharmonics have been derived. Generally these require filters and other complications which result in less efficiently operating and more costly equipment. In many instances the generation of these subharmonics results from nonlinear operation of the transistors used in the circuit. This is particularly true of amplifiers where nonlinear operation results from overdriving the transistor of the amplifier circuit. Therefore, the prevention of nonlinear operation is important to eliminating the generation of undesirable subharmonics.

The prevention of nonlinear operation of amplifiers is also undesirable for many other reasons. One obvious reason is the distortion present in the output signal as compared with the input signal. Under such conditions the output is not an "enlargement" of the input, but instead is quite different in waveform and other characteristics.

A number of secondary uses for the inventive circuit disclosed also exists. Among these, in addition to the reduction of harmonic generation in Class A broadband amplifiers as discussed hereinabove, is the use as a detector for automatic volume control systems.

It is therefore an object of this invention to provide a circuit for preventing a transistorized circuit from being overdriven.

It is another object of this invention to provide such a circuit which eliminates subharmonics in the output of a transistor circuit.

It is another object to provide such a circuit which assures continuous linear operation of a transistorized amplifier.

Further objects, features and advantages of the invention will become apparent from the following description and claims when read in view of the accompanying drawings wherein like numbers indicate like parts and in which:

Figure 1:
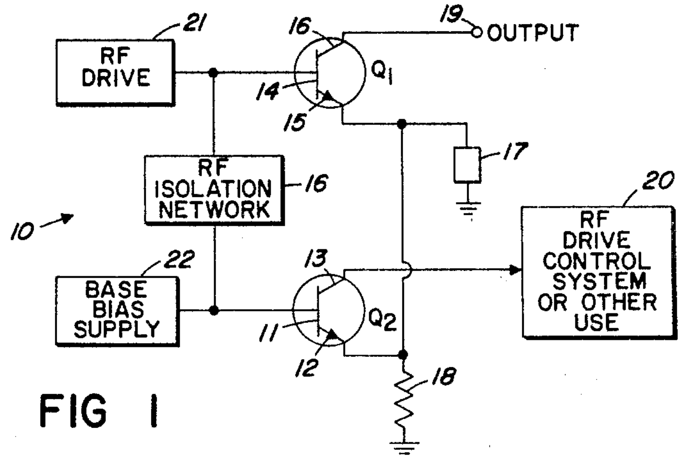
FIGURE 1 shows a generalized embodiment of the inventive circuit which can be used to control the output of any transistorized circuit.

The basic elements of the detection circuit are shown in FIGURE 1 where all the parts excepting transistor $Q_2$ are normally contained in a class A transistorized amplifier. Transistor $Q_2$ has its base 11 connected to base 14 of transistor $Q_1$ through R-F network isolation 16. The emitter 12 of transistor $Q_2$ is directly connected to the emitter 15 of transistor $Q_1$. Emitter 12 of transistor $Q_2$ is grounded through resistor 18 while emitter 15 of $Q_1$ is grounded through bypass network 17. In many instances bypass network 17 can be a capacitor, as is well known in the art.

Transistor $Q_2$ is chosen for base to emitter impedances much larger than the base-emitter impedance of transistor $Q_1$. The base bias supply 22 and emitter resistor 18 therefore predominately determine the collector current of transistor $Q_1$. Both transistors $Q_1$ and $Q_2$ must be made of materials with similar base-emitter junction barrier potentials and both must be either PNP or NPN.

The circuit operates as follows: Under normal class A operation the D-C base-emitter voltage of transistors $Q_1$ and $Q_2$ is determined by the junction barrier voltage and internal impedances of transistor $Q_1$. Transistor $Q_2$ will draw a base-emitter current much smaller than transistor $Q_1$ as a result of its higher base-emitter impedance. When R-F drive power is applied to the base of transistor $Q_1$ sufficient to cause nonlinear operation its average collector emitter current will increase. As a consequence of the increase in average collector-emitter current of transistor $Q_1$, the average voltage drop across the emitter resistor 18 will increase and the average base-emitter voltage will have a corresponding decrease. The resulting decrease in average base-emitter voltage of transistor $Q_1$ is directly applied to transistor $Q_2$ causing a decrease in its base current, and collector current through the corresponding transistor and circuit relationships.

The decrease in the collector current of transistor $Q_2$ can be used to perform various control functions. For example, it can be used to control the amount of R-F drive applied to the amplifier containing transistor $Q_1$ and effectively prevent the amplifier from being overdriven. Many other uses can be made of the decrease in the collector current of transistor $Q_2$ without departing from the scope of this invention.

Figure 2:
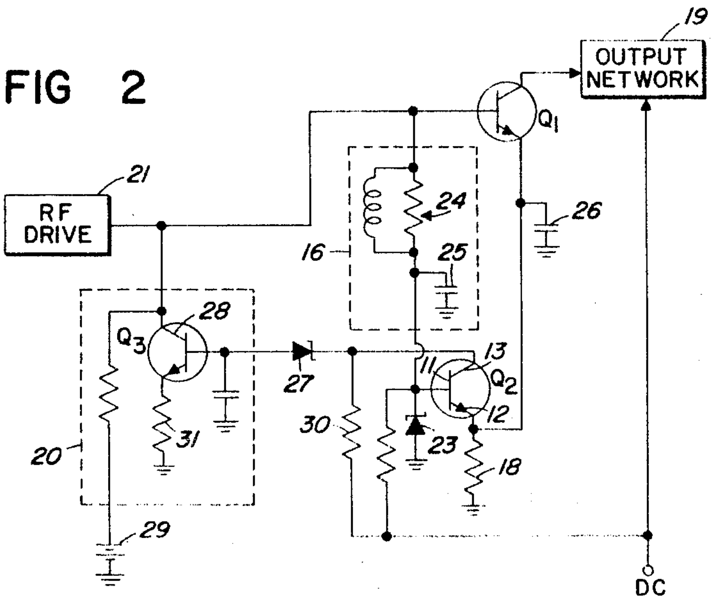
FIGURE 2 shows a specific embodiment of the invention wherein the output of a transistorized Class A amplifier is prevented from being overdriven into nonlinear operation.

FIGURE 2 shows a practical application of the above-described circuit to a broadband amplifier similar to that shown in FIG. 1. Transistors $Q_1$ and $Q_2$ and emitter resistor 18 are the same as shown in FIG. 1. Resistor 18 and diode 23 compose the base bias supply designated as 22 in FIG. 1. Impedance 24 and capacitor 25 compose the R-F isolation network 16, and capacitor 26 serves as the emitter bypass network 17. The R-F drive control 20 is shown controlling the R-F input to the amplifier. Collector 13 of transistor $Q_2$ is connected to R-F control 20 through a Zener diode 27. R-F drive control 20 is, in the embodiment shown, composed of a third transistor $Q_3$ the base of which is connected to the collector 13 of transistor $Q_2$ through rectifier 27. The collector 28 of $Q_3$ is connected to the R-F input and is positively biased by a voltage source 29.

In operation the circuit is normally operating linearly and transistor $Q_2$ is in collector saturation. Resistor 30 is chosen to give this result. Crystal rectifier 27 is then nonconductive and variable attenuator 20 is at minimum attenuation. $Q_3$ is nonconductive and therefore offers maximum impedance to the input signal. When the amplitude of the R-F input raises to a level sufficient to cause nonlinear operation of the amplifier the collector current of $Q_2$ decreases, as explained in reference to FIG. 1 hereinabove, the decrease of collector current renders rectifier 27 conductive. This places an input on the base of transistor $Q_3$ which renders it conductive and minimizes its impedance to the input signal. A portion of the input signal is thereby passed through $Q_3$ and dropped on resistor 31. This causes a decrease of the R-F input to the amplifier which will then return to linear operation, at which time the collector current of $Q_2$ raises to shut off diode 27. The amplifier then operates linearly until the input again surges, at which time the control operation is repeated.

Although this invention has been described with respect to particular embodiment thereof, it is not to be so limited, as changes and modifications may be made therein which are within the spirit and scope of the invention as defined by the appended claims.

I claim:

1. A circuit comprising a first transistor having emitter, collector and base elements, electrical drive means connected to the base element of said first transistor, means for receiving an amplified output voltage from the collector element of said first transistor, a second transistor having emitter, collector, and base elements, said second transistor having a larger base-emitter impedance than said first transistor, means electrically connecting the emitter element of said first transistor and the emitter element of said second transistor together and to a reference potential, means including an R-F isolation network connecting the base of said first transistor to the base of said second transistor, and means connected to the collector element of said second transistor and to the base element of said first transistor and responsive to changes in the current through said collector element to thereby maintain operation of said first transistor in a linear operating range.

2. A circuit as defined by claim 1 and further including biasing means for maintaining collector saturation of said second transistor when said first transistor is operating linearly.

3. A circuit as defined by claim 1 wherein said means connected to the collector element of said second transistor is a variable impedance the impedance of which is dependent on the collector current of said second transistor, said variable impedance being operably connected with a source of potential to vary the bias potential on the base element of said first transistor.

References Cited

UNITED STATES PATENTS

| | | | |
|---|---|---|---|
| 3,172,050 | 3/1965 | Ingle | 330—14 |
| 3,247,462 | 4/1966 | Kobbe | 330—14 |
| 3,281,702 | 10/1966 | Andrews | 330—14 |

FOREIGN PATENTS

| | | |
|---|---|---|
| 1,143,860 | 2/1963 | Germany. |
| 1,182,709 | 12/1964 | Germany. |

OTHER REFERENCES

QST, p. 45, March 1966.

IBM Tech. Disc. Bulletin, English, vol. 8, No. 4, September 1965, pp. 688, 689.

IBM Tech. Disc. Bulletin, Sharshinski, vol. 8, No. 6, November 1965, p. 920.

JOHN KOMINSKI, Primary Examiner

U.S. Cl. X.R.

330—22, 138, 139